United States Patent [19]

Wicker et al.

[11] 4,117,293
[45] Sep. 26, 1978

[54] METHOD FOR CONVEYING A ROW OF FORGING INGOTS THROUGH AN INDUCTIVE HEATING APPARATUS

[75] Inventors: Helmut Wicker, Herdecke; Werner Kielhorn, Essen-Steele; Gerhard Heyduk, Dortmund-Scharnhorst, all of Germany

[73] Assignee: BBC Brown, Boveri & Company Limited, Baden, Switzerland

[21] Appl. No.: 791,244

[22] Filed: Apr. 27, 1977

Related U.S. Application Data

[63] Continuation of Ser. No. 631,683, Nov. 12, 1975, abandoned.

[30] Foreign Application Priority Data

Nov. 14, 1974 [DE] Fed. Rep. of Germany ....... 2453940

[51] Int. Cl.² .............................................. H05B 5/06
[52] U.S. Cl. .............................. 219/10.41; 219/10.71; 219/10.73; 219/10.77
[58] Field of Search .............. 219/10.71, 10.69, 10.73, 219/10.67, 10.41, 10.75, 10.77; 266/249, 129

[56] References Cited

U.S. PATENT DOCUMENTS

| 2,329,188 | 9/1943 | Denneen et al. .................. 219/10.69 |
| 2,452,197 | 10/1948 | Kennedy ............................. 219/10.75 |
| 2,644,075 | 6/1953 | Coateggiano et al. ............ 219/10.69 |
| 3,051,812 | 8/1962 | Gschwender ...................... 219/10.69 |
| 2,482,5454 | 9/1949 | Jordan ................................ 219/10.73 |

OTHER PUBLICATIONS

"Induction Heater of Forging Billets", No. D1040309E, 13BC Brown Boveri & Cie, AG Mannheim, Germany.

Primary Examiner—Bruce A. Reynolds
Attorney, Agent, or Firm—Burns, Doane, Swecker & Mathis

[57] ABSTRACT

An inductive heating apparatus for forging ingots which are pushed in a row through the apparatus for thoroughly heating them and subsequent transport includes a friction disc type of drive engaging the ingots as they enter the inlet end of the heating apparatus. A thyristor-controlled d.c. shunt motor is used as the drive for the friction discs and the speed of this motor is controlled by a regulating device which is programmed for alternate low and high speeds, the low speed matching the required staying time of each ingot in the inductor heater necessary to thoroughly heat the same, and the high speed being used to effect a fast discharge of the heated ingot from the apparatus.

1 Claim, 1 Drawing Figure

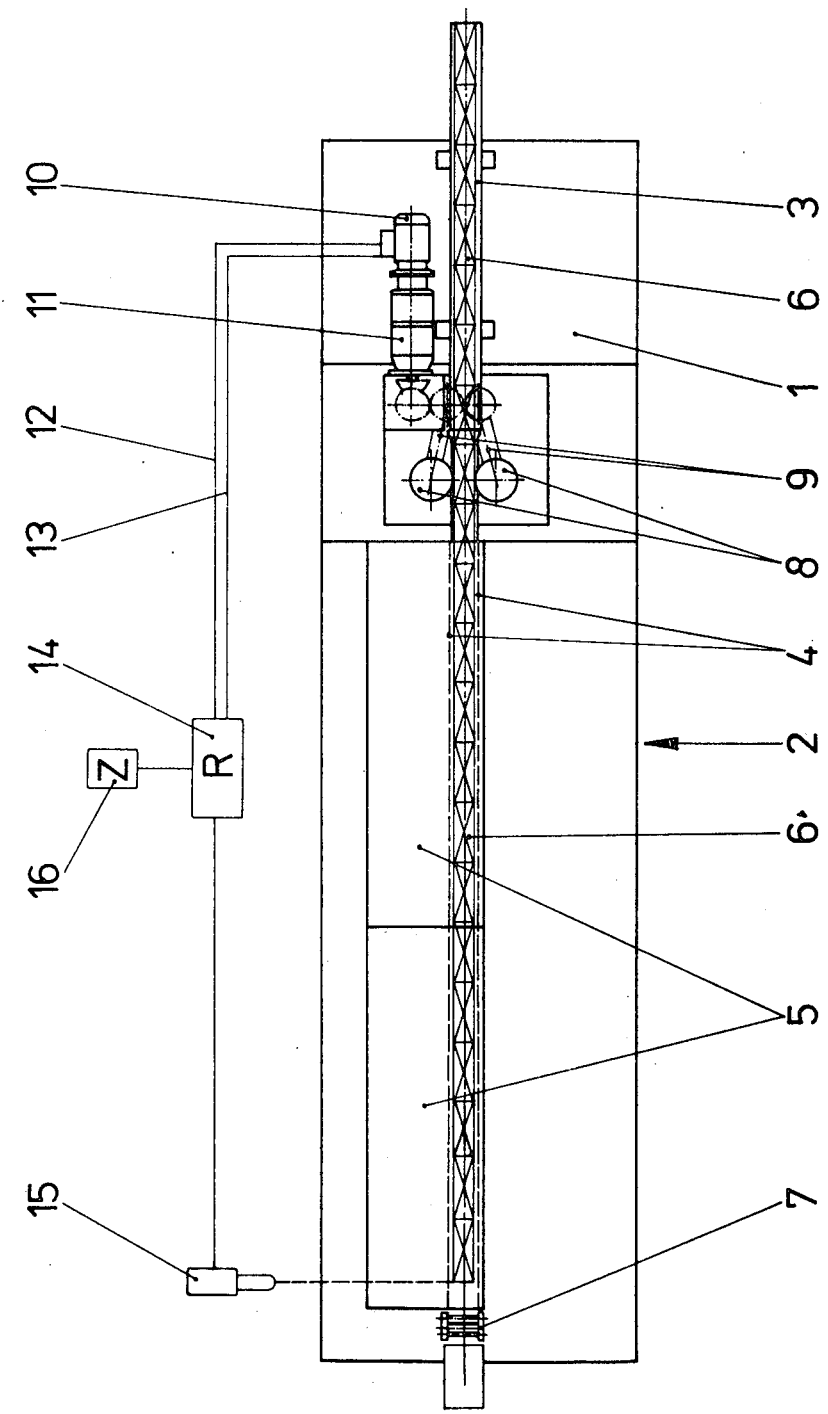

METHOD FOR CONVEYING A ROW OF FORGING INGOTS THROUGH AN INDUCTIVE HEATING APPARATUS

This invention relates to an improved method and apparatus to convey a row of forging ingots through an inductive heating apparatus onto an adjacent device for further transport by means of friction disks arranged in front of the heating apparatus.

It is known to employ methods of this type if it is desired to feed forging ingots, heated in an inductor unit, into a following shaping machine.

In the case of an inductive heating apparatus with friction disks arranged in front of it, each forging ingot, when seized by the disks, will push through the inductor unit the ingots lined up in series in front of it, so that there will be no need for any conveying means inside the inductor unit with the exception of the slide rails. It becomes thus feasible to attain a close coupling between the inductor unit and the forging ingots. Such coupling within heating units of this type results in a good thermal efficiency, while keeping the specific energy consumption at a low value. A constant and pre-determined staying time of the ingots within the inductor unit is necessary for a complete and thorough heating of the forging ingots, with the staying time functionally related to the electrical power of the inductor unit. In the case of this known method it is immaterial whether the ingots are moved through the inductor unit in a stepwise manner, or continuously, within the staying time allotted.

However, the staying time of the forging ingots within the inductor unit must be terminated at a gate because the most thoroughly heated ingot will cool off within the leakage field of the inductor exit, and will do so even more intensely when leaving the inductor unit slowly. Therefore, the methods in use heretofore do not insure a uniform heating of the ingots in their axial direction.

In order to overcome this deficiency, the end of the inductor unit is designed in form of a chute in order to remove and advance the forging ingots at a speed greater than the speed of their conveyance through the inductor unit. However, in this case it becomes necessary to widen the end of the inductor unit in order to allow the ingots to pitch down without abuting. The enlargement of the interior space of the inductor unit will permit a greater volume of atmospheric oxygen to reach the highly heated forging ingots, causing a heavier oxidation of the ingot surfaces, and thus greater scaling In order to avoid these disadvantages, there has been provided in place of a chute, and at a great increase in components, an extracting device after the inductor unit, removing the forging ingot in front from the inductor unit by means of grabs and delivering it to a conveyor system.

The principal object of the invention is to provide an improved method of conveying the ingots which will make it feasible to accomplish a rapid removal of the forging ingots from the inductor unit by use of the friction disks arranged in front of the inductive heating installation without the use of a complicated extracting device, or a chute with all their inherent disadvantages.

This problem is solved by the invention by a method of conveying forging ingots through an inductive heating installation in such manner that the forging ingots, lined up one after the other in a row, are pushed in turn through the inductor unit at various speeds thusly that the line of forging ingots is moved slowly up to an ingot position sensing unit of the photocell type placed near the end of the inductor unit, to conform with the staying time set in accordance with the inductor power capacity, and after expiration of the staying time for each fully heated forging ingot, is moved rapidly for a time period suited to the length of said forging ingot.

The primary advantage attained by the invention are that the heated forging ingots are transported by the same conveying means, first for the duration of their staying time up to the position sensing unit placed near the end of the inductor unit, secondly past the end of the coil practically without cooling off, and finally to a device which will transport the ingots to other machines.

The method can be applied in practice for example in that a thyristor-controlled, d.c. shunt-wound motor is used as the alternate slow and fast speed drive for the friction disks. This motor is controlled by a regulating device which can be programmed for the low speed matching the staying time in the inductor unit necessary for the heating of the line of forging ingots, as well as for the high-speed time period needed to thereafter discharge each fully heated forging ingot, and also for the actuation of these speeds. Also needed is a switch to change-over from one to the other speed. The change-over switch can also be equipped with a device to monitor the staying time which will delay the switch-over from low to high speed until the staying time has expired, in the event that the heated ingot appears prematurely at the barrier.

A preferred embodiment of an arrangement suitable for performing the novel method of advancing a row of forging ingots through the inductive heating apparatus at diverse speeds within the period of their staying time will now be described and is illustrated somewhat diagrammatically in the accompanying drawing.

With reference now to the drawing, an inductive heating system 2 is located on a bed 1 and is comprised of inductor units 5 located in series. A track 3 serves to feed a row of ingot blocks 6 to the bed 1 and these tracks are followed by slide rails 4, these rails extending to the end of the inductor units 5. At the exit end of the inductor units, the now heated ingots are provided with further transport means, e.g. a roller delivery bed 7. Friction drive wheels 8 are provided on both sides of the rails 4 in advance of the inductor units 5 which serve as the means for conveying the ingot blocks through the inductive heater and these drive wheels are mounted on lever arms 9 which serve to press the peripheries of the wheels into firm non-slip engagement with the sides of the ingot blocks. The ingot block which is engaged by the drive wheels 8 pushes against and advances all ingot blocks in the row located in front of it, and as one ingot block leaves the wheels 8 the block next behind is seized by the wheels and advanced.

The friction drive wheels 8 are driven by a thyristor-controlled d.c. shunt motor 10 which is capable of running at different speeds. A step-down gearing 11 is interposed between the drive shaft of motor 10 and the friction drive wheels 8 since at all possible operating speeds the speed of the wheels 8 will be substantially lower than the speed of motor 10.

A thyristor unit 14 is provided for supplying motor 10 with diverse amounts of power so as to establish the desired high and low speeds, there being one line 12 extending from the thyristor unit 14 to the motor 10 for effecting a fast drive of the wheels 8, and another similar line 13 for effecting a slow drive.

A position-sensing unit of the photocell type 15 connected to thyristor unit 14 is located at the exit end of the ingot blocks 6 from the inductor unit 5 where the magnetic field from the inductor begins to stray. The position-sensing unit 15 functions to prevent the foremost and fully heated ingot block 6 from approaching the inductor exit at the slow speed geared to the staying time within the influence of the heating effect produced by induction, and thus cooling off too rapidly within the stray field of the inductor.

The thyristor motor speed control unit 14 is further connected with a timing unit 16 to regulate the duration of the staying time and thus the speed of the slow drive for the ingot blocks being heated. The thyristor unit 14 itself contains a further time circuit to enter the time period for the fast drive of the ingot drive wheels 8 by which, in each case, the fully heated ingot block at the leading end of the end-to-end contacting row of ingot blocks is quickly transferred from the location of the position-sensing unit 15 to the further transporting means at the exit end of the induction heating apparatus, i.e. to the roller delivery bed 7 where it is thus quickly separated from the next behind ingot block and carried away. The magnitude of this time period is determined in accordance with the length of the heated ingot blocks which are to be removed quickly from the inductive heating apparatus at the conclusion of the desired staying time.

Since the period of time for the fast drive forms one portion of the overall staying time required for thorough heating of the ingot blocks, it becomes necessary to move the blocks during the other portion of the staying time through the inductor units 5 in slow drive at a correspondingly reduced speed so that they will arrive at the position-sensing unit 15 at the proper moment. This is accomplished automatically by the control unit 14. If the foremost ingot block should arrive at the 15 prior to expiration of the desired staying time, the thyristor unit 14 will function to bring motor 10 to a stop and with it the drive wheels 8, until the staying time has expired. Only at that moment will the thyristor unit 14 effect removal of a fully heated ingot block from the inductor unit 5 at a fast drive, thereupon moving all other blocks in low drive until the next block arrives at the position-sensing unit 15.

We claim:

1. The method of heating elongated forging ingots which comprises the steps of progressively push feeding a continuous row of the ingots through an induction heater having sufficient length to effect simultaneous heating of all the ingots in the row from the rear charging end of the heater at which the feeding takes place to the front discharge end thereof and in conformity with a prescribed staying time determined by the inductive heating power so that the ingots in the row become progressively heated as they are fed through the heater from one end thereof to the other, sensing the approach of the foremost ingot in the row to the discharge end of the heater and simultaneously therewith temporarily increasing the feed rate of the ingot row through said heater for a predetermined time period dependent upon the length of the fully heated foremost ingot thus to quickly remove such ingot from the discharge end of said heater, decreasing the feed rate of the ingot row upon expiration of said predetermined time period so as to cause the next-to-be discharged fully heated ingot at the head of the row to approach the discharge end at the proper time, and temporarily stopping the feed of the ingot row through said heater in the event that said next-to-be discharged ingot should arrive at the discharge end of said heater prior to expiration of said prescribed staying time.

* * * * *